(12) United States Patent
Üner et al.

(10) Patent No.: US 9,990,505 B2
(45) Date of Patent: Jun. 5, 2018

(54) TEMPORALLY ISOLATING DATA ACCESSED BY A COMPUTING DEVICE

(71) Applicant: Redwall Technologies, LLC, Beavercreek, OH (US)

(72) Inventors: Eric Ridvan Üner, Carpentersville, IL (US); Michael J. Collins, Beavercreek, OH (US); Kent H. Hunter, Beavercreek, OH (US); John E. Rosenstengel, Beavercreek, OH (US); James E. Sabin, Chicago, IL (US); Kevin S. Woods, Beavercreek, OH (US)

(73) Assignee: Redwall Technologies, LLC, Bevercreek, OH (US)

( * ) Notice: Subject to any disclaimer, the term of this patent is extended or adjusted under 35 U.S.C. 154(b) by 287 days.

(21) Appl. No.: 14/824,709

(22) Filed: Aug. 12, 2015

(65) Prior Publication Data

US 2016/0048693 A1    Feb. 18, 2016

Related U.S. Application Data

(60) Provisional application No. 62/036,197, filed on Aug. 12, 2014.

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2105* (2013.01)

(58) Field of Classification Search
CPC ............................ G06F 21/604; G06F 21/6218
USPC .......................................................... 713/189
See application file for complete search history.

(56) References Cited

U.S. PATENT DOCUMENTS

| | | |
|---|---|---|
| 4,493,021 A | 1/1985 | Agrawal et al. |
| 5,623,545 A | 4/1997 | Childs et al. |
| 6,671,809 B1 | 12/2003 | Perona et al. |
| 6,934,857 B1 | 8/2005 | Bartleson et al. |
| 6,952,778 B1 | 10/2005 | Snyder |
| 7,171,690 B2 | 1/2007 | Kouznetsov et al. |
| 7,283,820 B2 | 10/2007 | Kamijo et al. |

(Continued)

FOREIGN PATENT DOCUMENTS

WO    2010151859 A1    12/2010

*Primary Examiner* — Hadi S Armouche
*Assistant Examiner* — Angela R Holmes
(74) *Attorney, Agent, or Firm* — Wood Herron & Evans LLP

(57) ABSTRACT

Embodiments of the present invention provide a method to temporally isolate data accessed by a computing device so that the data accessed by the computing device is limited to a single set of data. The method includes removing any data that is accessed by the computing device when operating in different modes so that the data is inaccessible by the computing device when operating in the mode. The method also includes switching to the mode after the data associated with the modes different from the mode have been removed. The method also includes operating in the mode based on a plurality of rules associated with the security policy in temporal isolation from any other mode associated with the computing device. The computing device is limited to operating in the mode and is prevented from accessing any data that is distinct from the single set of data of the mode.

17 Claims, 2 Drawing Sheets

(56) References Cited

U.S. PATENT DOCUMENTS

| | | |
|---|---|---|
| 7,401,230 B2 | 7/2008 | Campbell et al. |
| 7,607,173 B1 | 10/2009 | Szor et al. |
| 7,634,559 B2 | 12/2009 | Brown |
| 7,665,125 B2 | 2/2010 | Heard et al. |
| 7,681,226 B2 | 3/2010 | Kraemer et al. |
| 7,849,454 B2 | 12/2010 | Lambert et al. |
| 8,230,515 B1 | 7/2012 | Brewton et al. |
| 2002/0099952 A1 | 7/2002 | Lambert et al. |
| 2003/0009452 A1 | 1/2003 | O'Rourke et al. |
| 2003/0041255 A1 | 2/2003 | Chen et al. |
| 2004/0010703 A1 | 1/2004 | Kouznetsov et al. |
| 2004/0193912 A1 | 9/2004 | Li et al. |
| 2004/0213331 A1 | 10/2004 | Peeters et al. |
| 2005/0005152 A1 | 1/2005 | Singh et al. |
| 2005/0202803 A1 | 9/2005 | Mahalal |
| 2006/0075488 A1 | 4/2006 | Barrett et al. |
| 2006/0150256 A1 | 7/2006 | Fanton et al. |
| 2007/0006159 A1 | 1/2007 | Hecht et al. |
| 2007/0177611 A1 | 8/2007 | Armstrong et al. |
| 2007/0204125 A1 | 8/2007 | Hardy |
| 2007/0240217 A1* | 10/2007 | Tuvell ............... G06F 21/56 726/24 |
| 2007/0266421 A1* | 11/2007 | Vaidya ............... H04L 63/20 726/1 |
| 2008/0034197 A1 | 2/2008 | Engel et al. |
| 2008/0066148 A1 | 3/2008 | Lim |
| 2008/0086776 A1 | 4/2008 | Tuvell et al. |
| 2008/0109871 A1 | 5/2008 | Jacobs |
| 2008/0178256 A1 | 7/2008 | Perrone et al. |
| 2008/0250217 A1 | 10/2008 | Kershaw et al. |
| 2010/0138352 A1 | 6/2010 | Witkowski et al. |
| 2010/0199086 A1 | 8/2010 | Kuang et al. |
| 2011/0047594 A1 | 2/2011 | Mahaffey et al. |
| 2011/0047620 A1* | 2/2011 | Mahaffey ............... G06F 21/564 726/23 |
| 2011/0209219 A1 | 8/2011 | Zeitlin et al. |
| 2012/0216242 A1 | 8/2012 | Uner et al. |
| 2017/0208078 A1* | 7/2017 | Howard ............... H04L 63/1416 |

\* cited by examiner

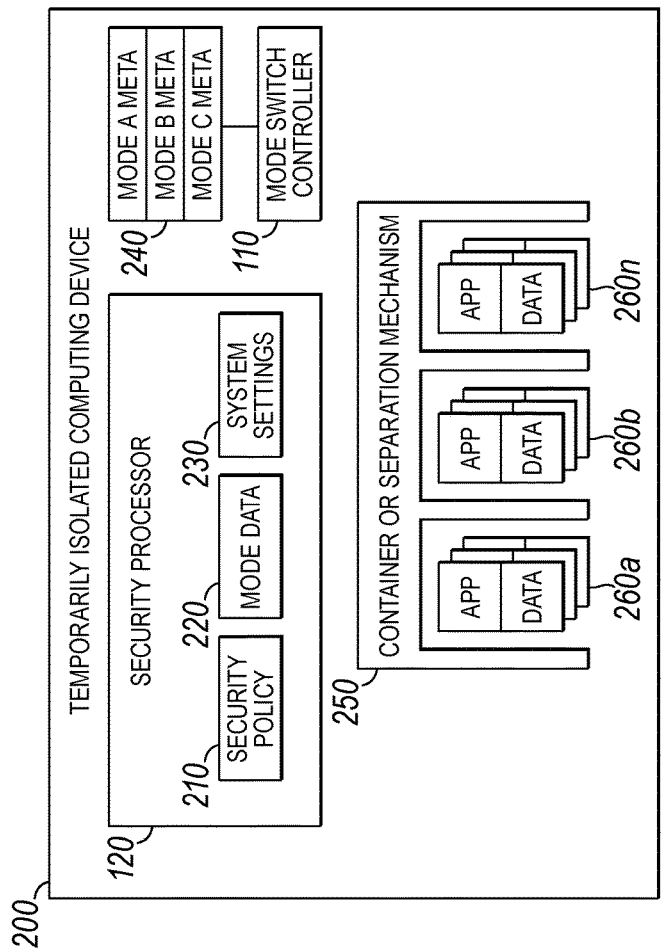
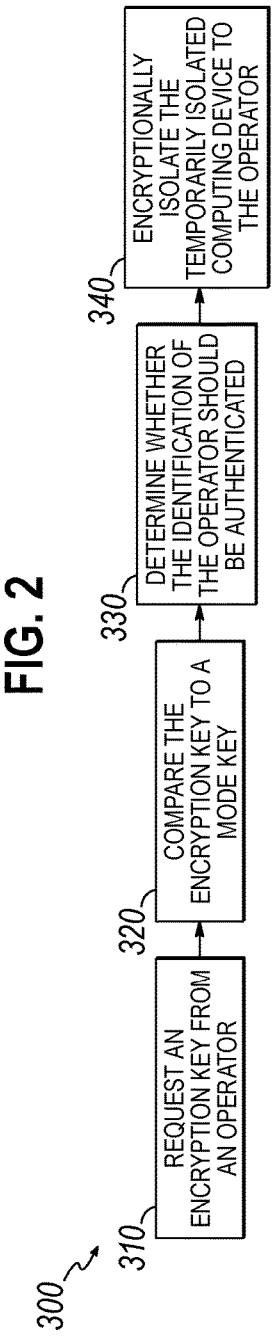
FIG. 2
FIG. 3

TEMPORALLY ISOLATING DATA ACCESSED BY A COMPUTING DEVICE

CROSS-REFERENCE TO RELATED APPLICATIONS

This application is a U.S. Nonprovisional Application which claims the benefit of U.S. Provisional Application No. 62/036,197 filed on Aug. 12, 2014, which is incorporated herein by reference in its entirety.

BACKGROUND

Field of the Invention

The present invention generally relates to computing systems. More particularly, the present invention is directed to architecture and methods for providing secure operating modes of a computer system.

Related Art

Cyber security is significant issue facing society with society's ever increasing reliance on computing devices. The greater the reliance on computing devices translates to increasing amounts of data stored and/or accessed by computing devices to execute requested tasks. For example, computing devices are no longer limited to servers, databases, and/or desktop computers. Rather, computing devices such as mobile devices and smartphones, are being increasingly relied upon the workplace, in everyday life and so on. Further, systems such as automobiles, devices around the home, elements of SCADA (supervisory control and data acquisition systems) that control power, traffic, and many other facets of infrastructure now contain embedded computing devices.

The greater the reliance on computing devices translates to increasing amounts of data stored and/or accessed by computing devices in order for the computing devices to execute requested tasks. The significantly large quantities of computing devices in so many different applications that are accessing data provide a target rich environment for hackers to hack into such computing devices and access the data and/or gain control of the computing devices to fraudulently implement the data and/or computing devices to negatively impact individuals and/or society.

Conventional methods of security attempt to isolate data that is accessible based on security postures. For example, a set of data and applications associated with a specific individual are only available to the computing system that the individual is engaging after the individual has provided the appropriate password. However, a hacker and/or malicious code that are able to bypass the security can still access the data and applications because the data and applications are still accessible to computing device.

Other conventional methods of security attempt to add virtualized layers of security, such as a hypervisor. The hypervisor than acts as the gatekeeper and determines which data can be accessed based on the security postures associated with the operator and/or software attempting to access such data. However, the data and applications are still stored on the computing device and accessible by the operating system of the computing device. A hacker and/or malicious code that are able to bypass the hypervisor can still access the data because the data is present on the computing device. If the security levels are breached, the secure data can be captured.

Any type of conventional method of security that has the data that is to be protected remain on the computing device and/or is accessible to the operating of the computing device is susceptible to a data breach. Eventually, a hacker and/or malicious code that are sufficiently sophisticated may overcome the security and access the secure data when the data is accessible to the operating system of the computing device.

BRIEF SUMMARY

What is needed, therefore, is a method and system for temporally isolating data accessed by a computing device so that the data accessed by the computing device is limited to a single set of data that the computing device is authorized to access.

In an embodiment, a method temporally isolates data accessed by a computing device so that the data accessed by the computing device is limited to a single set of data. A command may be received to switch to a mode. The mode includes the single set of data and a security policy. Any data that is accessed by the computing device when operating in a different mode that is distinct from the single set of data of the mode so that the data may be inaccessible by the computing device when operating in the mode. Switching to the mode may occur after the data associated with the different modes that is distinct from the mode have been removed. Operating in the mode may occur based on a plurality of rules associated with the security policy in temporal isolation from any other mode associated with the computing device. The computing device is limited to operating in the mode and is prevented from accessing any data that is distinct from the single set of data of the mode.

In an embodiment, a system temporally isolates data accessed by a computing device so that the data accessed by the computing device is limited to a single set of data. The system includes a mode switch controller that is configured to receive a command to switch to a mode. The mode includes the single set of data and a security policy. The mode switch controller is also configured to remove any data that is accessed by the computing device when operating in different modes that is distinct from the single set of data of the mode so that the data is inaccessible by the computing device when operating in the mode. The mode switch controller is also configured to switch the computing device to the mode after the data associated with the different modes have been removed. The system also includes a security processor that is configured to control the computing device to operate in the mode based on a plurality of rules associated with the security policy in temporal isolation from any other mode associated with the computing device. The computing device is limited to operating in the mode and is prevented from accessing any data that is distinct from the single set of data of the mode.

Additional features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings combined herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the pertinent art to make and use the present invention. Various embodiments of the present invention are described below with reference to the drawings, wherein like reference numerals are used to refer to like elements throughout.

FIG. 2 shows a block diagram of an exemplary temporally isolated computing device that provides further detail with regards to how temporally isolated computing device switches between modes; and FIG. 3 depicts a flowchart showing an example method of cryptographic isolation of temporally isolated computing device.

DETAILED DESCRIPTION

Figure 1:
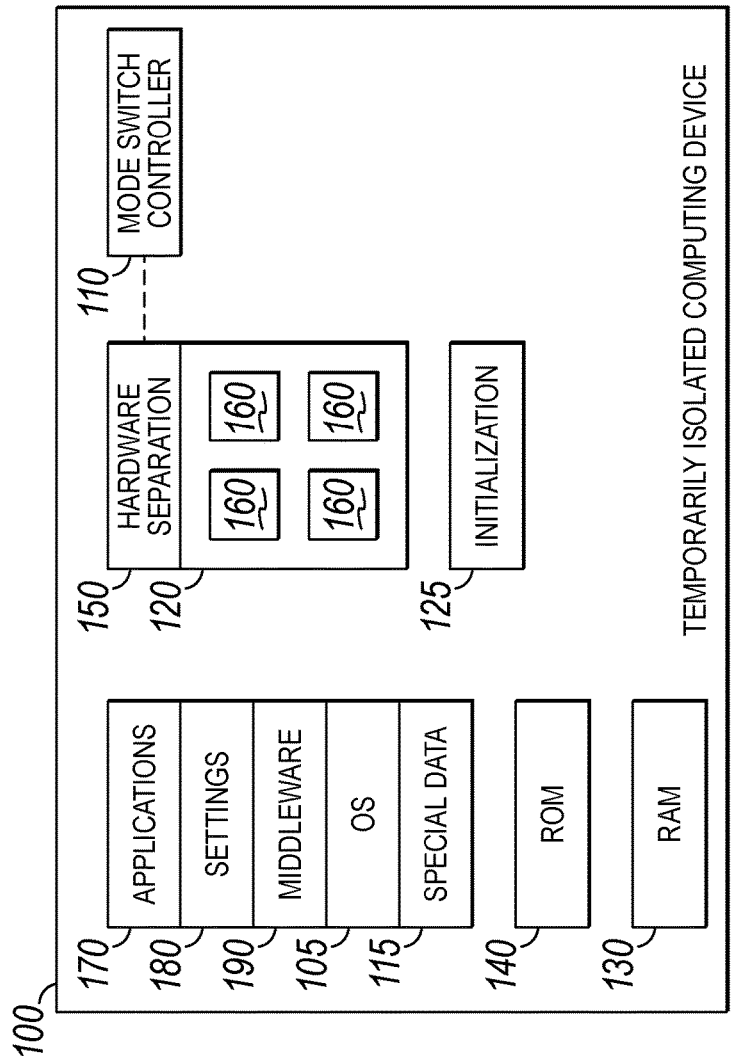
FIG. 1 shows a block diagram of an exemplary temporally isolated computing device.

The term "embodiments of the present invention" does not require that all embodiments of the present invention include the discussed feature, advantage or mode of operation. Alternate embodiments may be devised without departing from the scope of the present invention, and well-known elements of the present invention may not be described in detail or may be omitted so as not to obscure the relevant details of the present invention. In addition, the terminology used herein is for the purpose of describing particular embodiments only and is not intended to be limiting of the present invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence of addition of one or more other features, integers, steps, operations, elements, components, and/or groups thereof.

System Overview

FIG. 1 is a block diagram of an exemplary temporally isolated computing device 100 that includes a mode switch controller 110, a security processor 120, volatile memory 130, non-volatile memory 140, applications 170, settings 180, a middleware layer 190, an operating system 105, data 115 not associated with applications 170, and an initialization layer 125. Security processor includes a hardware separation mechanism 150 and one or more cores 160.

Temporally isolated computing device 100 may be a device that is capable of electronically communicating with other devices. Examples of temporally isolated computing device 110 may include a mobile telephone, a smartphone, a workstation, a portable computing device, other computing devices such as a laptop, or a desktop computer, cluster of computers, set-top box, a computer peripheral such as a printer, a portable audio, and/or video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system, a SCADA element such as a human machine interface (HMI), and or any other suitable electronic device that will be apparent to those skilled in the relevant art(s) without departing from the spirit and scope of the invention.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

Temporally isolated computing device 100 can include (not shown) one or more control processors, field programmable gate arrays (FPGA), application specific integrated circuits (ASIC), and/or digital signal processors (DSP). Temporally isolated computing device 100, for example, executes the control logic including operating system 105, applications 170, mode switch controller 110, and security processor 120 that control operation of temporally isolated computing device 100. Temporally isolated computing device 100 may include one or more single or multi-core computing units.

Temporally isolated computing device 100 may include non-volatile memory 140 as well as volatile memory 130. Volatile memory 130 may include random access memory (RAM), dynamic random access memory (DRAM) or other such memories attached directly to temporally isolated computing device 100 that is separate from non-volatile memory 140.

Volatile memory 130 may store processing logic instructions, constant values, and variable values during execution of portions of applications and/or other processing logic. For example, in one embodiment, parts of control logic to perform one or more operations on temporally isolated computing device 100 may reside within volatile memory 130 during execution of the respective portions of the operation by temporally isolated computing device 100. The term "processing logic" or "logic," as used herein, refer to control flow instructions, instructions for performing computations, and instructions for associated access to resources. During execution, respective applications 170, operating system functions 105, processing logic instructions, and system software may reside in volatile memory 130. Control logic instructions fundamental to operating system 105 may generally reside in volatile memory 130 during execution.

Operating system 105 includes components and software/firmware providing functionality to manage the hardware components of temporally isolated computing device 100 and to provide common services. In various embodiments, processes defined by operating system 105 may execute on temporally isolated computing device 100 and provide common services. These common services may include, for example, scheduling applications for execution within temporally isolated computing device 100, fault management, interrupt service, as well as processing the input and output of other applications. Operating system 105 and middleware 190 may run in either non-volatile memory 140, volatile memory 130, or some combination of both.

Processing logic for applications 170, operating system 105, and system software can include instructions specified in a programming language such as C and/or in a hardware deception language such as Verilog, RTL, or netlists, to enable configuring a manufacturing process through the generation of maskworks/photomasks to generate a hardware device embodying aspects of the present invention described herein.

A person skilled in the relevant art will understand, upon reading this description that temporally isolated computing device 100 can include one or more input interfaces, non-volatile storage, one or more output interfaces, network interfaces, and one or more displays or display interfaces.

Settings 180 may include but is not limited to temporal isolated computing device 100's network configuration, energy-saving preferences, X.509 security certificates, and/or data specific to applications 170 that exist outside of a mode, such as the bookmarks associated with the web browser of temporal isolated computing device 100. Settings 180 may also describe access to settings rather than settings themselves. For example, settings 180 may describe a selection implementing a unilaterally available address book on a smartphone and/or an address book specific to a mode.

Hardware separation mechanism 150 may include hardware support, a software component of a mobile device management (MDM) framework, and/or may not be present.

Temporal isolated computing device 100 may be implemented in environments in which different individuals may engage temporal isolated computing device 100 for different functions. For example, temporal isolated computing device 100 may be positioned in a hospital environment and may be accessed by a radiologist as well as a scheduler that is assigned to schedule X-ray reads for the radiologist.

In such an environment, the radiologist may log into temporal isolated computing device 100 to access patient X-rays, patient information, patient medical history and so on. Such access may be provided to the radiologist by temporal isolated computing device 100 based on the log-in information of the radiologist. Temporal isolated computing device 100 may then provide the appropriate access to the radiologist after the radiologist has successfully logged into temporal isolated computing device 100.

After the radiologist has completed his session with temporal isolated computing device 100, radiologist may then log off of temporal isolated computing device 100. After logging off of temporal isolated computing device 100, temporal isolated computing device 100 may no longer provide the access to the information that the radiologist is privileged to access. The scheduler may then log into temporal isolated computing device 100 in which the scheduler may have access to scheduling information for X-rays for the radiologist to read as well as the ability to adjust the schedule of reads for the radiologist. Temporal isolated computing device 100 may then provide the appropriate access to the scheduler based on the log-in information of the scheduler while preventing the scheduler access to the access privileges of the radiologist and vice versa.

As noted above, computing devices are susceptible to cyber attacks, hackers attempting to fraudulently access data available on computing devices, and/or malicious code that is designed to circumvent the security measures of the computing devices and obtain unauthorized access to data. Conventional methods provide layers of security in an attempt to prevent the unauthorized access to the data available on a computing device.

For example, containerization is a conventional approach that attempt to separate access to different types of data by adding layers of security postures. In containerization, layers of authorization is required in order to determine whether the operator that is attempting to engage the computing device to access a specific type of data is indeed the appropriate party that should have access to such data. Examples of containerization approaches include log-in information of username and password, encryption key techniques, and/or hardware-based levels of security. In such containerization approaches, such as the log-in information, the conventional computing device determines what type of access to data to provide to an operator based on the log-in information. The radiologist receives access to X-ray type data based on the log-in information of the radiologist while the scheduler receives access to scheduling information based on the log-in information of the scheduler.

In another example, virtualization is a conventional approach in which virtual memory designed to control access to data on a computing system, such as a hypervisor, acts as the gatekeeper of the computing system. The hypervisor isolates data and limits access based on the type of application attempting to access the data stored on the conventional computing system. In such virtualization approaches, the application that is launched based on an operator's log-in information is regulated by the hypervisor as to the types of data that the application is to access. The radiologist that successfully logs in to the computing device launches an application specific to reading X-rays and the hypervisor limits the type of data that is accessible to that application to X-ray type data. The hypervisor then limits the type of data that the application launched for the scheduler to scheduling type data.

However, such conventional security approaches are susceptible to being circumvented by hackers and/or malicious code. Eventually, a hacker that is sufficiently motivated is likely to circumvent log-in information and/or hardware-based containerization approaches. Similarly, the author of malicious code that is sufficiently motivated is likely to eventually create malicious code that is capable of circumventing the hypervisor. When these types of security breaches occur with conventional security approaches, the data is stored in a location within the conventional computing device and/or a location in a server, database, the cloud and so on that is accessible to the hacker and/or malicious code. Thus, as long as the data is located within the conventional computing device and/or in a location that can be traced by the hacker and/or malicious code, such data is always susceptible to being fraudulently accessed despite any type of conventional security approaches that are in place.

Rather temporally isolated computing device 100 may temporally isolate data that may be accessed based on a mode in which temporally isolated computing device 100 is operating. Temporal isolation is the isolation of data such that the data that temporally isolated computing device 100 may access is limited to a single set of data that can only be accessed while operating in a mode that provides access to the single set of data. Temporally isolated computing device 100 may only operate in a single mode at a time thus isolating the data available to temporally isolated computing device 100 to data associated with the mode. All other data associated with other modes is not accessible to temporally isolated computing device 100 even if the security measures associated with temporally isolated computing device 100 are circumvented by a hacker and/or malicious code. All other data that is distinct from the single set of data is removed from any location that could be accessible by temporally isolated computing device 100.

Data includes any type of data, settings, applications, instructions, rules, and/or any other type of computer based aspect that may be accessed by the operating system of a computing device that will be apparent from those skilled in the relevant art(s) without departing from the spirit and scope of the present disclosure. A mode is a distinct operating architecture that provides the metes and bounds in which temporally isolated computing device 100 may operate when engaged in the mode.

For example, the mode includes a single set of data that is only accessible to operating system 105 of temporally isolated computing device 100 when temporally isolated computing device 100 is operating in the mode. The mode also includes one or more security policies. The one or more security policies associated with the mode define the type of actions as well as which data included in the single set of data that the operating system 105 may access as well as the data which may be executed and/or accessed by different applications 170 executed by operating system 105 when operating in the mode.

Any other data outside of the single set of data may be removed by mode switch controller 110 before switching to the mode. After receiving a command to switch to the mode, such as a log-in by an operator, mode switch controller 110 may remove any data outside of the single set of data associated with the mode from temporally isolated computing device 100 such that the removed data may not be accessed by operating system 105 when temporally isolated computing device 100 is operating in the mode. The removal of any data such that operating system 105 includes the elimination of any data in locations within temporally isolated computing device 100, such as memory, and/or locations external to temporally isolated computing device 100, such as external servers, that operating system 105 may have any potential of accessing when operating in the mode. The removal of such data includes the removal from any location that operating system 105 may access even when a hacker and/or malicious code circumvents the security levels of temporally isolated computing device 100.

For example, the scheduler logs into temporally isolated computing device 100 with the intention to engage applications 170 associated with scheduling. Applications 170 associated with scheduling may be outlined by a scheduling mode in which scheduling specific applications 170 are launched when temporally isolated computing device 100 transitions to the scheduling mode enabling the scheduler to access scheduling data, execute scheduling tasks and so on based on the security policies associated with the scheduling mode.

However, before switching to the scheduling mode, mode switch controller 110 removes any type of data, applications, instructions, rules, security policies and so on that are associated with the mode in which the radiologist operates. In doing so, mode switch controller 110 removes such data not included in the scheduling set of data from volatile memory 130, servers that operating system 105 may have access, cloud storage that operating system 105 may have access and so on. Mode switch controller 110 removes any type of data not included in the scheduling set of data from any location that operating system 105 may access when operating in the scheduling mode. In doing so, even if malicious code were to launch upon the switch to the scheduling mode and circumvent any security policies associated with the scheduling mode, any data not included in the scheduling set of data, such as patient diagnosis, cannot be reached by the malicious code because the data is not present in any location that may be accessed by operating system 105.

After any data outside of the single set of data associated with the requested mode is removed from temporally isolated computing device 100, security processor 120 may then launch temporally isolated computing device 100 into the requested mode. In doing so, security processor 120 may regulate the operation of temporally isolated computing device 100 based on the rules associated with the security policies associated with the mode in temporal isolation from any other mode associated with temporally isolated computing device 100. Security processor 120 may prevent temporally isolated computing device 100 from accessing any type of data that is distinct from the single set of data associated with the mode.

For example, security processor 120 may regulate operating system 105 such that operating system 105 launches applications 170, accesses data, executes instructions and so on as allowed by the security policy associated with the scheduling mode. Security processor 120 may allow a scheduling application to be launched while accessing scheduling data and so on. However, security processor 120 may prevent operating system 105 from executing any applications, accessing data, and so on that exceeds the privileges allowed by the security policy associated with the scheduling mode.

Temporal Isolation

As noted above, temporally isolated computing device 100 may operate in a single mode in which temporally isolated computing device 100 may access a single set of data associated with the single mode and any other data is removed from temporally isolated computing device 100. FIG. 2 is a block diagram of an exemplary temporally isolated computing device that provides further detail with regards to how temporally isolated computing device 200 switches between modes. Temporally isolated computing device 200 includes mode switch controller 110, security processor 120, a plurality of modes 260($a$-$n$) where n is an integer greater than or equal to 1, a container mechanism 250, and a list of valid modes 240. Security processor includes a security policy 210, mode data 220, and system settings 230. Temporally isolated computing device 200 shares many similar features with temporally isolated computing device 100; therefore, only the differences between temporally isolated computing device 200 and temporally isolated computing device 100 are to be discussed in further detail.

Temporally isolated computing device 200 may operate in a mode, such as mode 260$a$, and then switch to another mode, such as mode 260$b$, when an operator requests to engage temporally computing isolated computing device 200 in a mode that is distinct from the original mode. An operator may be an individual, a computing device, a software program, and/or any other type of entity that is able to operate isolated computing device 200 in the mode that will be apparent to those skilled in the relevant art(s) without departing from the spirit and scope of the present disclosure. Temporally isolated computing device 200 may operate in modes 260($a$-$n$), however temporally computing device 200 may operate in any number of modes in which n is greater than or equal to one that may be temporally isolated that will be apparent to those skilled in the relevant art(s) without departing from the spirit and scope of the present disclosure.

For example, temporally isolated computing device 200 is currently operating in mode 260$a$. In doing so, mode switch controller 110 has already removed all applications and data associated with modes 260$b$ and 260$n$ from non-volatile memory 140 and any other location that operating system 105 may possibly access such that temporally isolated computing device 200 is operating in mode 260$a$ and is temporally isolated from modes 260$b$ and 260$n$. Security processor 120 then allows operating system 105 to launch the applications associated with mode 260$a$ and access the data associated with mode 260$a$ based on security policy 210 associated with mode 260$a$. Any hacker and/or malicious code that attempts to circumvent security policy 210 associated with mode 260$a$ and launch applications and/or access data associated with modes 260$b$ and 260$n$ is unable to do so because operating system 105 cannot access modes 260b and 260n due to the removal of the applications and data associated with modes 260b and 260n. Operating system 105 may have no knowledge of the existence of modes 260b and 260n.

Mode switch controller 110 may then receive a command to switch from mode 260a to mode 260b as provided by list of valid modes 240. Mode switch controller 110 may then remove any applications and data associated with mode 260a from temporally isolated computing device 200 by removing the applications and data from non-volatile memory 140 and any other location that operating system 105 may possibly access. In doing so, operating system 105 may have no knowledge of the existence of the applications and data associated with mode 260a. Mode switch controller 110 may also reboot temporally isolated computing device 200, unmount file systems, pause and save the state of mode-specific elements associated with the mode 260a, terminate other processes, block access to any mode including the current mode, zeroizing, initializing, randomizing non-volatile memory 130 and/or any other action to eliminate traces of mode 260a before switching to mode 260b that will be apparent to those skilled in the relevant art(s) without departing from the spirit and scope of the present disclosure.

After all data and applications associated with mode 260a is removed, mode switch controller 110 may then switch from mode 260a to mode 260b. In doing so, initialization layer 125 may then retrieve the applications and data associated with mode 260b from a location that is accessible by initialization layer 125 but inaccessible to operating system 105. Initialization layer 125 does not load any type of elements, applications, and/or data from modes 260a and 260n into any file system mount points, memory, and/or any other resources available to operating system 105. Rather, the applications and data associated with mode 260b may be stored in volatile memory 130, a disk, flash memory, a microSD system, a server inaccessible to operating system 105, a position in the cloud inaccessible to operating system 105, and/or any other location that may store the applications and data associated with mode 260b but is inaccessible by operating system 105 that will be apparent to those skilled in the relevant art(s) without departing from the spirit and scope of the present disclosure.

After the data and applications associated with mode 260b have been retrieved by initialization layer 125, mode switch controller 110 may then launch operating system 105. When launched, operating system 105 may have no knowledge of the applications and data associated with mode 260a because such applications and data have been removed from temporally isolated computing device 200 and cannot be accessed by operating system 105. Security processor 120 may then regulate the application launched and the data accessed by operating system 105 with regards to mode 260b based on security policy 210 associated with mode 260b. Any attempt by a hacker and/or malicious code to circumvent security policy 210 and access any applications and data associated with mode 260a and 260n is prevented due to the temporal isolation of mode 260b. Temporally isolated computing device 200 is solely operating in mode 260b.

In an embodiment, temporally isolated computing device 200 may then switch back to mode 260a from mode 260b. Mode switch controller 110 may receive a command to switch back to mode 260a from mode 260b. Mode switch controller 110 may then remove any applications and data associated with mode 260b from temporally isolated computing device 200 by removing the applications and data from non-volatile memory 140 and any other location that operating system 105 may possibly access. In doing so, operating system 105 may have no knowledge of the existence of the applications and data associated with mode 260b. After all data and applications associated with mode 260b are removed, mode switch controller 110 may then switch back to mode 260a from mode 260b. In doing so, initialization layer 125 may then retrieve the applications and data associated with mode 260a from a location that is accessible by initialization layer 125 by in accessible to operating system 105. Temporally isolated computing device 200 may switch back and forth between modes 260a, 260b, and 260n any number of times as requested in which mode switch controller 110 removes any application and data associated with the previous mode before switching to any subsequent mode.

As noted above, mode switch controller 110 may receive a command to switch from mode 260a to mode 260b. In an embodiment, the command may be received from the operator when the operator is attempting to log into temporally isolated computing device 200 to engage temporally isolated computing device 200 in the desired mode. In such an embodiment, mode switch controller 110 may request that the operator provide identification when attempting to engage temporally isolated computing device 200 in the desired mode. The operator may provide identification to mode switch controller 110. Mode switch controller may then authenticate the identification of the operator by determining whether the identification provided by the operator matches authorization to access a mode from list of valid modes 240. Mode switch controller 110 may determine the mode from list of valid modes 110 to transition temporally isolated computing device 200 when mode switch controller 110 affirmatively authenticates the operator as having access to the mode. Mode switch controller 110 may disallow the transition to any mode from list of valid modes 110 when mode switch controller 110 fails to authenticate the operator.

In an embodiment, the operator may request to engage temporally isolated computing device 200 before operating system 105 has been activated and is running. In such an embodiment, the operator may provide log-in information as discussed above as identification such that mode switch controller 110 may determine which mode to transition temporally isolated computing device 200 based on log-in information. The operator, as discussed in further detail below, may also provide encryption key information as identification such that mode switch controller 110 may determine which mode to transition temporally isolated computing device 200 based on the comparison of the encryption key to a mode key. Mode switch controller 110 may authenticate the identity of the operator when attempting to engage temporally isolated computing device 200 before operating system 105 has been activated in any manner sufficient to authenticate the identity of the operator that will be apparent to those skilled in the relevant art(s) without departing from the spirit and scope of the invention.

In an embodiment, mode switch controller 110 may transition from mode 260a to mode 260b automatically without the intervention of the operator. In such an embodiment, mode switch controller 110 may transition from mode 260a to mode 260b when a parameter associated with the transitioning from mode 260a to mode 260b is satisfied. A parameter is a context based event or characteristic that triggers a switch to a specified mode when the event occurs and/or the characteristic is satisfied.

For example, temporally isolated computing device 200 is a smartphone that has a personal mode 260a and a secure mode 260b. Temporally isolated computing device 200 is operated by a military employee with high security clearance. The military employee may engage temporally isolated computing device 200 in personal mode 260a and engage in which operating system 105 may launch applications such as facebook, twitter, email, the internet and so on. Mode switch controller 110 may allow temporally isolated computing device 200 to operate in personal mode 260a as long as temporally isolated computing device 200 is outside of a geographic perimeter of the military base that the military employee reports to. The military base has strict security policies in place that prohibits any type of computing device within the perimeter of the military base that can be accessed by unprotected applications such as facebook, twitter, email, the internet and so on.

As a result, mode switch controller 110 may automatically transition temporally isolated computing device 200 from personal mode 260a to secure mode 260b when temporally isolated computing device 200 registers global positioning system (GPS) coordinates that are within the geographic perimeter of the military base. Temporally isolated computing device 200 automatically transitions to secure mode 260b without any intervention by the military employee once the parameter of the GPS coordinates being within the geographic perimeter of the military base. As a result, operating system 105 is automatically prevented from accessing any unsecure applications as well as any data associated with facebook, twitter, and so on because any trace of the applications and data is removed from temporally isolated computing device 200 upon the automatic transition to secure mode 260b.

In an embodiment, mode switch controller 110 may transition from mode 260a to mode 260b based on a manual request from the operator. In such an embodiment, the operator may be engaging temporally isolated computing device 200 in mode 260a and then quickly requests to transition to mode 260b without having to first shutdown operating system 105 by logging out of mode 260a and then logging back into mode 260b. Rather, the operator may manually request temporally isolated computing device 200 transition between mode 260a to 260b in real-time.

For example, temporally isolated computing device 200 may be a communications device that is operated by an undercover police officer. The undercover police office may be engaging in a personal mode 260a such that if an unauthorized individual were to obtain temporally isolated computing device 200 when in personal mode 260a would be unable to detect any applications and/or data that could blow the identity of the undercover police officer.

However, the undercover police officer may manually request that mode switch controller 110 switch to an emergency mode 260b in real-time when the undercover police officer is witnessing criminal activity and requests to implement temporally isolated computing device 200 to capture the criminal activity. Mode switch controller 110 may then execute the necessary steps of removing any applications and data associated with personal mode 260a and switch temporally isolated computing device 200 to emergency mode 260b so that the undercover police officer may capture the criminal activity. The undercover police officer may then manually request in real-time that temporally isolated computing device 200 transitions back to the personal mode 260a. Mode switch controller 110 may then execute the steps of removing any trace of applications and/or data associated with the capturing of the criminal activity executed in emergency mode 260b and switch temporally isolated computing device 200 back to personal mode 260a. In doing so, any unauthorized use of temporally isolated computing device 200 by a criminal would be unable to detect the captured data of the criminal activity such as photographs, video footage and so on. Any data associated with the capturing of the criminal activity would be removed from temporally isolated computing device 200 and thus undetectable by a criminal engaging temporally isolated computing device 200 when operating in personal mode 260a.

The operator may select whether to switch to mode 260(a-n) via applications 170 in which the operator may view, select, and switch between modes provided by list of modes 240. List of modes 240 may be pulled from a database and/or a list of valid modes that the operator may engage. List of modes 240 may also be hidden from the operator such that the operator may be unable to view list of modes 240. The operator may click on a button to trigger a mode switch and/or simply launch application 170 and that may trigger the mode switch.

Cryptographic Isolation

As noted above, mode switch controller 110 may switch temporally isolated computing device 200 from mode 260a to mode 260b when the identity of the operator requesting the switch has been authorized. Mode switch controller 110 may request that the operator provide an encrypted key so that mode switch controller 110 may determine whether the operator should be authorized to engage temporally isolated computing device 200 as well as the mode 260(a-n) that the operator has authorization to engage. After mode switch controller 110 has switched temporally isolated computing device 200 to the appropriate mode 260(a-n) based on the encryption key, mode switch controller 110 may cryptograpically isolate temporally isolated computing device 200 so that no other encryption keys may be entertained that are requesting to engage the current mode. Rather, only encryption keys that request a switch in mode requiring a removal of applications and data of the current mode before switching may be entertained by mode switch controller 110.

One such implementation of cryptographic isolation is illustrated by process 300 in FIG. 3. Process 300 includes four primary steps: request an encryption key from an operator, compare the encryption key to a mode key, determine whether the identification of the operator should be authenticated, and cryptographically isolate the temporally isolated computing device to the operator. Steps 310-340 are typically implemented in a computer, e.g., via software and/or hardware, e.g., temporally isolated computing device 100 of FIG. 1 and temporally isolated computing device 200.

In step 310, mode switch controller 110 may request an encryption key from an operator. In order for mode switch controller 110 to switch from mode 260a to 260b, mode switch controller 110 may request that the operator provide an encryption key in order to determine whether the operator should be authorized to engage temporally isolated computing device 200 as well as to determine which mode 260(b-n) to switch to. The encryption key may be any type of encryption key that provides a unique identifier that identifies the operator and cannot identify any other unauthorized operator when provided to mode switch controller 110. Examples of encryption keys may include but are not limited to passwords, PINs, PIV cards, smartcards, hardware tokens, fingerprints, biometric encryption keys, and/or any other type of identification that uniquely identifies the operator that will be apparent to those skilled in the relevant art(s) without departing from the spirit and scope of the invention.

In an example embodiment, step 310 may be performed by mode switch controller 110 as shown in FIG. 1 and FIG. 2.

In step 320, mode switch controller 110 may compare the encryption key to a mode key. Mode switch controller 110 may compare the encryption key provided by the operator to the mode key to determine whether the encryption key matches the mode key. The mode key may be stored by mode switch controller 110 and contains identification information that identifies the operator as well as the mode in which the operator is authorized to engage when the operator provides an encryption key that matches the mode key. After the operator provides the encryption key, mode switch controller 110 may search for a mode key that matches the encryption key. In an example embodiment, step 320 may be performed by mode switch controller 110 as shown in FIG. 1 and FIG. 2.

In step 330, mode switch controller 330 may determine whether the identification of the operator should be authenticated. As noted above mode switch controller 110 may search for a mode key that matches the encryption key. Mode switch controller 110 may authorize the identity of the operator when the mode switch controller 110 is able to match the encryption key to the mode key. Mode switch controller 110 may then access the identification information of the operator as well as the mode 260($a$-$n$) that the operator is authorized to access from the mode key and initiate the switch of temporally isolated computing device 200 to the appropriate mode. Mode switch controller 110 may deny the operator access to any modes 260($a$-$n$) when mode switch controller 110 fails to match the encryption key to a mode key. In an example embodiment, step 330 may be performed by mode switch controller 110 as shown in FIG. 1 and FIG. 2.

In step 340, mode switch controller 110 may cryptographically isolate temporally isolated computing device 200 to the operator. After mode switch controller 110 has authorized the operator to engage temporally isolated computing device 200, mode switch controller may not only temporally isolate temporally isolated computing device 200 to the mode that the operator is authorized to engage but cryptographically isolate as well. As noted above, mode switch controller 110 may temporally isolate temporally isolated computing device 200 such that temporally isolated computing device 200 only operates in a single mode 260($a$-$n$) at a time and prevents multiple modes from operating simultaneously. Mode switch controller 110 may also cryptogrpahically isolate temporally isolated computing device 200 such that mode switch controller 110 refrains from entertaining any other encryption key that requests to engage temporally isolated computing device 200 when operating in the current mode.

For example, a police officer that is beginning his shift as the dispatch officer presents an encryption key to temporally isolated computing device 200. Mode switch controller 110 determines that the police officer is authorized to engage temporally isolated computing device 200 in mode 260$a$ which is the dispatch mode so that the police officer may implement temporally isolated computing device 200 for dispatch purposes. After mode switch controller 110 switches to mode 260$a$, mode switch controller 110 may refuse to entertain any other encryption keys that are presented to temporally isolated computing device 200 when operating in mode 260$a$.

A detective that presents an encryption key to engage temporally isolated computing device 200 in mode 260$a$ may be refused by mode switch controller 110. Mode switch controller 110 has cryptographically isolated temporally isolated computing device 200 such that only the police officer authorized to engage temporally isolated computing device 200 for dispatch purposes in mode 260$a$ is allowed to do so. Any other attempts to engage temporally isolated computing device 200 while operating mode 260$a$ may be refuted by mode switch controller 110. As a result, temporally isolated computing device 200 may be isolated both temporally in which temporally isolated computing device 200 operates in a single mode 260($a$-$n$) at a time as well as cryptographically isolated in which only a single operator may engage temporally isolated computing device 200 at a time. In an example embodiment, step 340 may be performed by mode switch controller 110 as shown in FIG. 1 and FIG. 2.

The foregoing description of the specific embodiments will fully reveal the general nature of the present invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on teaching and guidance presented herein. It is to be understood that the phraseology or terminology herein is for the purpose of description and not limitation, such that the terminology or phraseology of the specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of temporally isolating data so that the data accessed by a computing device is limited to a set of data associated with a current mode of operation, comprising:
   receiving a first command to switch to a first mode of operation associated with a first set of data and a first security policy;
   receiving an identification of an operator of the computing device that is requesting to engage the computing device in the first mode of operation;
   authenticating the identification of the operator;
   in response to the identification of the operator being authenticated, initiating a transition of the computing device to switch to the first mode of operation,
   in response to the identification of the operator failing authentication, disallowing the transition of the computing device to switch to the first mode of operation;
   in response to initiating the transition to the first mode of operation, removing any data accessible by the computing device associated with modes of operation different from the first mode of operation so that the removed data is inaccessible by the computing device when operating in the first mode of operation;
   storing a second set of data associated with at least one of the modes of operation different from the first mode of operation in a location that is inaccessible to an operating system associated with the computing device so that the operating system is unable to access the second set of data when operating in the first mode of operation;
   in response to the data associated with the modes of operation different from the first mode of operation being removed, switching to the first mode of operation; and operating in the first mode of operation based on a first plurality of rules associated with the first security policy in temporal isolation from any data associated with any other mode of operation of the computing device, wherein the computing device is limited to operating in the first mode of operation and is prevented from accessing any removed data of any other mode of operation while in the first mode of operation.

2. The method of claim 1, further comprising:

receiving a second command to switch from the first mode of operation to a second mode of operation that is associated with another set of data and a second security policy;

in response to receiving the second command, removing the first set of data so that the first set of data is inaccessible by the computing device when operating in the second mode of operation;

switching to the second mode of operation after the first set of data associated with the first mode of operation has been removed; and operating in the second mode of operation based on a second plurality of rules associated with the second security policy in temporal isolation from the first mode of operation, wherein the computing device is limited to operating in the second mode of operation and is prevented from accessing the first set of data of the first mode of operation while in the second mode of operation.

3. The method of claim 1, further comprising:

cryptographically isolating, by the computing device, the identification of the operator to an encryption key applied by the operator to initiate the transition of the computing device to the first mode of operation when the operator is affirmatively authenticated to prevent a different encryption key from being implemented in an attempt to engage the first mode of operation after the computing device has initiated the transition to the first mode of operation.

4. The method of claim 3, further comprising:

comparing the encryption key applied by the operator to a mode key associated with the first mode of operation that the operator is requesting to engage, wherein the mode key is stored in a location that is accessible to an initialization layer of the computing device and inaccessible to the operating system of the computing device; and initiating, by the computing device, the transition of the computing device to switch to the first mode of operation when the encryption key matches the mode key or disallowing the transition of the computing device to switch to the first mode of operation when the encryption key fails to match the mode key.

5. The method of claim 1, further comprising:

storing the first set of data in a location that is accessible by an initialization layer associated with the computing device after the identification of the operator attempting to switch the computing device to the first mode of operation is affirmatively authenticated.

6. The method of claim 1, further comprising:

uploading the first set of data to the location that is accessible to the operating system associated with the computing device when the computing device has switched to the first mode of operation so that the operating system is able to access the first set of data based on the first plurality of rules associated with the first security policy.

7. The method of claim 1, further comprising:

automatically initiating the transition to the first mode of operation when a parameter associated with transitioning to the first mode of operation is satisfied.

8. The method of claim 7, wherein the parameter associated with the automatic transition to the first mode of operation is based on a geographic location of the computing device.

9. A system for temporally isolating data so that the data accessed by a computing device is limited to a set of data associated with a current mode of operation, comprising:

a mode switch controller configured to:
receive a first command to switch to a first mode of operation associated with a first set of data and a first security policy,
receive an identification of an operator of the computing device that is requesting to engage the computing device in the first mode of operation,
authenticate the identification of the operator,
in response to the identification of the operator being authenticated, initiate a transition of the computing device to switch to the first mode of operation,
in response to the identification of the operator failing authentication, disallow the transition of the computing device to switch to the first mode of operation,
in response to initiating the transition to the first mode of operation, remove any data accessible by the computing device associated with modes of operation different from the first mode of operation so that the removed data is inaccessible by the computing device when operating in the first mode of operation,
store a second set of data associated with at least one of the modes of operation different from the first mode of operation in a location that is inaccessible to an operating system associated with the computing device so that the operating system is unable to access the second set of data when operating in the first mode of operation, and
in response to the data associated with the modes of operation different from the first mode of operation being removed, switch the computing device to the first mode of operation; and a security processor configured to:
control the computing device to operate in the first mode of operation based on a first plurality of rules associated with the first security policy in temporal isolation from any data associated with any other mode of operation of the computing device,
wherein the computing device is limited to operating in the first mode of operation and is prevented from accessing any removed data of any other mode of operation while in the first mode of operation.

10. The system of claim 9, wherein the mode switch controller is further configured to:

receive a second command to switch from the first mode of operation to a second mode of operation that is associated with another set of data and a second security policy;

in response to receiving the second command, remove the first set of data so that the first set of data is inaccessible by the computing device when operating in the second mode of operation; and switch the computing device to the second mode of operation after the first set of data associated the first mode of operation has been removed.

11. The system of claim 10, wherein the security processor is further configured to:

operate in the second mode of operation based on a second plurality of rules associated with the second security policy in temporal isolation from the first mode of operation, wherein the computing device is limited to operating in the second mode of operation and is prevented from accessing the first set of data of the first mode of operation.

12. The system of claim 9, wherein the mode switch controller is further configured to cryptographically isolate the identification of the operator to an encryption key applied by the operator to initiate the transition of the computing device to the first mode of operation when the operator is affirmatively authenticated to prevent a different encryption key from being implemented in an attempt to engage the first mode of operation after the computing device has initiated the transition to the first mode of operation.

13. The system of claim 12, wherein the mode switch controller is further configured to:

compare the encryption key applied by the operator to a mode key associated with the first mode of operation that the operator is requesting to engage, wherein the mode key is stored in a location that is accessible to an initialization layer of the computing device and inaccessible to the operating system of the computing device; and initiate the transition of the computing device to switch to the first mode of operation when the encryption key matches the mode key or disallowing the transition of the computing device to switch to the first mode of operation when the encryption key fails to match the mode key.

14. The system of claim 9, wherein the mode switch controller is further configured to store the first set of data in a location that is accessible by an initialization layer associated with the computing device after the identification of the operator attempting to switch the computing device to the mode is affirmatively authenticated.

15. The system of claim 9, wherein the mode switch controller is further configured to upload the first set of data to the location that is accessible to the operating system associated with the computing device when the computing device has switched to the first mode of operation so that the operating system is able to access the first set of data based on the first plurality of rules associated with the first security policy.

16. The system of claim 9, wherein the mode switch controller is further configured to automatically initiate the transition to the first mode of operation when a parameter associated with transitioning to the first mode of operation is satisfied.

17. The system of claim 16, wherein the parameter associated with the automatic transition to the first mode of operation is based on a geographic location of the computing device.

* * * * *